United States Patent
Lin et al.

(10) Patent No.: US 9,773,348 B2
(45) Date of Patent: Sep. 26, 2017

(54) HEAD MOUNTED DEVICE AND GUIDING METHOD

(71) Applicant: INSTITUTE FOR INFORMATION INDUSTRY, Taipei (TW)

(72) Inventors: Ching-Wen Lin, New Taipei (TW); Wei-Yuan Lin, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 77 days.

(21) Appl. No.: 14/946,794

(22) Filed: Nov. 20, 2015

(65) Prior Publication Data
US 2017/0103572 A1    Apr. 13, 2017

(30) Foreign Application Priority Data

Oct. 7, 2015 (TW) .............................. 104133062 A

(51) Int. Cl.
*G09G 5/00*    (2006.01)
*G06T 19/00*    (2011.01)
*G02B 27/01*    (2006.01)

(52) U.S. Cl.
CPC .......... *G06T 19/003* (2013.01); *G02B 27/017* (2013.01); *G02B 27/0172* (2013.01); *G06T 19/006* (2013.01); *G02B 2027/014* (2013.01); *G02B 2027/0138* (2013.01); *G02B 2027/0141* (2013.01); *G02B 2027/0187* (2013.01)

(58) Field of Classification Search
CPC . G06T 19/003; G06T 19/006; G02B 27/0172; G02B 2027/0141; G02B 2027/0138; G02B 2027/014

See application file for complete search history.

(56) References Cited

U.S. PATENT DOCUMENTS

| 2014/0225915 A1* | 8/2014 | Theimer | G02B 27/017 345/633 |
| 2016/0005233 A1* | 1/2016 | Fraccaroli | G02B 27/0172 345/633 |

FOREIGN PATENT DOCUMENTS

| TW | 201003589 A1 | 1/2010 |
| TW | 201303639 A1 | 1/2013 |
| TW | M470354 U | 1/2014 |
| TW | M498354 U | 4/2015 |

OTHER PUBLICATIONS

The office action of the corresponding Taiwan application issued on Mar. 11, 2016.

* cited by examiner

*Primary Examiner* — Adam R Giesy
(74) *Attorney, Agent, or Firm* — CKC & Partners Co., Ltd.

(57) ABSTRACT

A head mounted device suitable for guiding an exhibition is disclosed. The head mounted device includes an image capturing unit, a process module and an information interface. The process module includes a recognition unit, a computing unit and a control unit. The image capturing unit captures an input image in invisible spectrum. The recognition unit recognizes an invisible code from the input image. The computing unit calculates a relative distance and a relative angle between the head mounted device and an exhibition object. By comparing the relative distance with a threshold distance, the control unit determines whether to trigger the information interface and present an exhibit-object introduction based on relative distance and relative angle.

14 Claims, 8 Drawing Sheets

HEAD MOUNTED DEVICE AND GUIDING METHOD

RELATED APPLICATIONS

The present application claims priority to Taiwan Application Serial Number 104133062, filed Oct. 7, 2015, all of which are herein incorporated by reference.

BACKGROUND

Field of Invention

The present disclosure relates to a head mounted device and a guiding method. More particularly, the present disclosure relates to a guiding system applied with an invisible code.

Description of Related Art

In general, each object displayed in an exhibition has corresponding histories or backgrounds. In order to make visitors deeply realize those objects and more participate in the exhibition, tour guides or mobile device with guiding systems are provided in most exhibitions.

However, a group of visitors may be leaded and followed after tour guide to have deeper understanding of the exhibition, and other visitors may be interrupted when the exhibition is crowded. On the other hand, current mobile device guiding systems include technologies related to Quick Response Code and Radio Frequency. However, visitors have to hold mobile devices in front of real patterns (e.g., QR Code) to obtain information related to objects if they use a QR Code guiding system. It will significantly interrupt visitors. Moreover, one object can only display one kind of object information at a time. On the other hand, because Radio Frequency guiding systems may not be able to provide an accurate position, visitors will be interrupted in an exhibition.

SUMMARY

A head mounted device is provided in the present disclosure. The head mounted device includes an image capturing unit, a process module and an information interface. The image capturing unit captures an input image in an invisible domain of an optical spectrum. The process module coupled to the image capturing unit and the information interface. The process module includes a recognition unit, a computing unit and a control unit. The recognition unit is configured to recognize an invisible code from the input image. The computing unit calculates a relative distance and a relative angle between the head mounted device and an exhibition object according to a size and a position of the invisible code corresponding to the input image. By comparing the relative distance with a threshold distance, the control unit is configured to determine whether to trigger the information interface and present exhibit-object information based on relative distance and relative angle.

In brief, a guiding method suitable for a head mounted device is disclosed in the present disclosure. In the guiding method, an input image is captured in an invisible domain of an optical spectrum, and an invisible code corresponding to exhibit-object information is recognized from the input image. A relative distance and a relative angle between the head mounted device and an exhibition object are determined according to a size and a position of the invisible code corresponding to the input image. An information interface presents exhibit-object information when the relative distance smaller than a threshold distance.

BRIEF DESCRIPTION OF THE DRAWINGS

Features, advantages and embodiments of the present disclosure are best understood from the following detailed description when read the accompanying figures.

DETAILED DESCRIPTION

Figure 1:
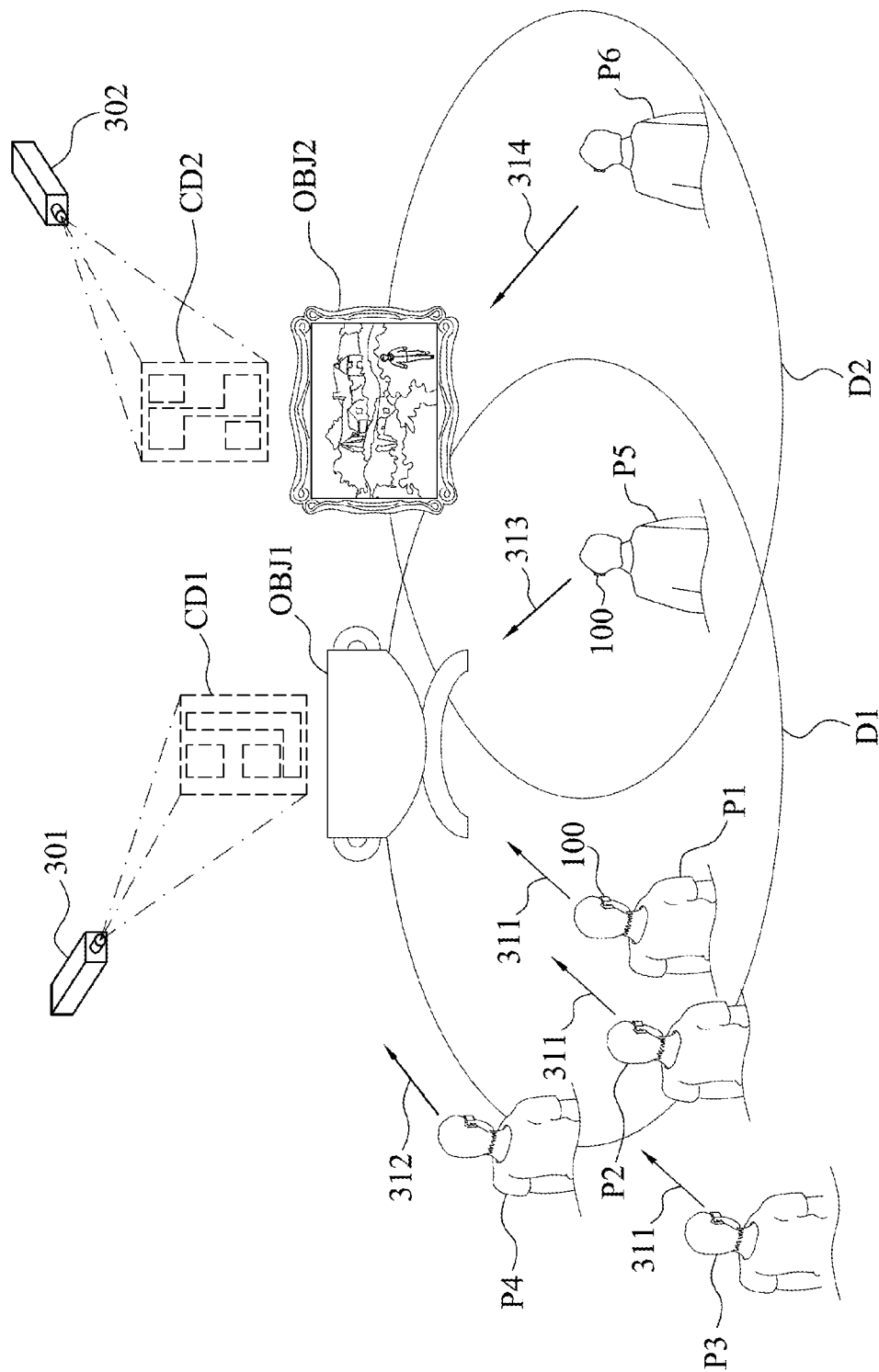
FIG. 1 is a schematic diagram of a head mounted device in accordance with one embodiment of the present disclosure.

FIG. 1 is a schematic diagram of a head mounted device in accordance with one embodiment of the present disclosure. In general, an exhibition includes a plurality of exhibition objects. As illustratively shown in FIG. 1, there are two exhibition objects OBJ1 and OBJ2. In some other embodiments, there are more exhibition objects in an exhibition (not shown in the figure). In some embodiments, a head mounted device is a smart glasses or a smart helmet.

The head mounted device 100 is configured to provide exhibit-object information of the exhibition object OBJ1 and the exhibition object OBJ2. The exhibit-object information include backgrounds, authors, years, histories, materials and styles about the exhibition object OBJ1 and the exhibition object OBJ2. The head mounted device 100 presents a literal introduction, a voice introduction, an image introduction, a multimedia introduction, and an entity signal introduction in accordance with a proper exhibition object. For example, the exhibition object OBJ1 is a gunmetal art in this embodiment. When the exhibition object OBJ1 is in a visitor's sight, the head mounted device 100 presents specific exhibit-object information about the gunmetal art. The exhibition object OBJ2 is a landscape painting in this embodiment. When the exhibition object OBJ2 is in a visitor's sight, the head mounted device 100 presents specific exhibit-object information about the landscape painting. The detailed description about how the head mounted device 100 determines to present a literal introduction, a voice introduction, an image introduction, a multimedia introduction or an entity signal introduction about specific exhibit-object information will illustrated in the following paragraphs.

Figure 2:
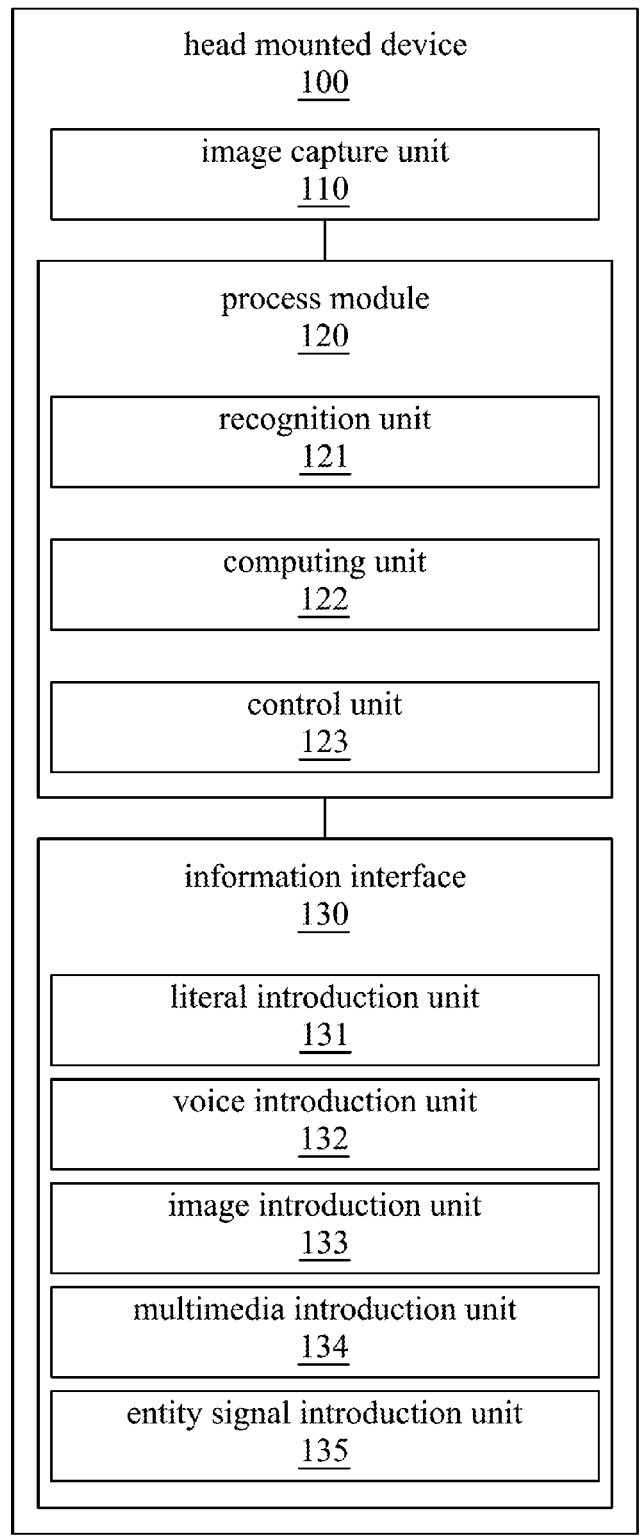
FIG. 2 is a block diagram of the head mounted device in accordance with one embodiment of the present disclosure.

Reference is made to FIG. 2, which illustrates a block diagram of the head mounted device 100 of the present disclosure. The head mounted device 100 is a smart head mounted device or a smart glasses, but the present disclosure is not limited to the embodiment given above.

The image capturing unit 110 is configured to capture an input image in an invisible domain of an optical spectrum. The input image may include at least one exhibition object and an invisible code corresponding to an exhibition object.

In an embodiment, the input image includes at least one invisible code. For example, in some embodiments, the invisible code is an infrared ray or an ultraviolet ray. However, the present disclosure should not be limited to the description of the embodiment contained herein. As illustratively shown in FIG. 1, the exhibition object OBJ1 and the exhibition object OBJ2 are configured with an invisible code CD1 and an invisible code CD2 correspondingly. The invisible code CD1 which has a specific format (e.g., a code which fits in with QR code or ArUco) is projected onto the wall near the exhibition object OBJ1 via a projector of infrared ray or a projector of ultraviolet ray. However, the present invention should not be limited to the description of the embodiment contained herein. In some embodiments, the invisible code CD1 is projected onto a position around the exhibition object OBJ1 (e.g., a glass frame which contains the exhibition object OBJ1). In some other embodiments, the invisible code CD1 is directly projected onto the exhibition object OBJ1.

The invisible code CD1 described above is a 2D bar code formed by an invisible spectrum. The image capture 110 is a camera or a lens for the corresponding invisible spectrum. The image capture 110 is configured to capture an image outside of a visible domain of the optical spectrum. In other words, the invisible code CD1 and the invisible CD2 are invisible to human beings. However, the input image captured by the image capturing unit 100 can clearly catch the contents of the invisible code CD1 and the invisible CD2.

A process module 120 includes a recognition unit 121, a computing unit 122 and a control unit 123. The recognition unit 121 is configured to recognize an invisible code from the input image. For example, an algorithm of recognizing codes is used to search for anchor points which fit in with QR code format or an ArUco format, and the contents of the codes (e.g., a bar code, distributions of square dots, numbers or other formats) are obtained according to the anchor points. Various methods about recognizing codes from images are apparent to those skilled in the art, so there is no more repeat herein.

The computing unit 122 calculates a relative distance and a relative angle between the head mounted device 100 and the invisible code (CD1 or CD2) according to a size and a position of the invisible code CD1 and the invisible code CD2 corresponding to the input image. By comparing the relative distance with a threshold distance, the control unit 123 determines whether to trigger the information interface 130 and present exhibit-object information based on a relative distance and a relative angle. The calculation and the comparison of the relative distance and the relative angle will be illustrated in embodiments in the following paragraphs.

The information interface 130 is configured to output exhibit-object information. For example, the information interface 130 includes at least one of a literal introduction unit 131, a voice introduction unit 132, an image introduction unit 133, a multimedia introduction unit 134, and an entity signal introduction unit 135 which are configured to output corresponding exhibit-object information. In some embodiments, the literal introduction unit 131 is a LED display or an electronic paper with low-power-consumption. The voice introduction unit 132 is a speaker. The image introduction unit 133 is a LCD with a 2D function or a 3D function. The multimedia introduction unit 134 is a device which provides services of Augmented Reality (AR) or Virtual Reality (VR). The entity signal introduction unit 135 is a vibrator which provides a real vibration signal.

Please refer to FIG. 3 which is a flow chart of a method illustrating a guiding method 200 in accordance with the present disclosure. In step S202, a built-in guiding program of the head mounted device 100 starts when a user enters an exhibition.

In step 204, the head mounted device 100 detects the exhibition object is watched by the user. The exhibition object generates a code from an invisible domain of an optical spectrum. The code is provided by a projector or an active light-emitting component. As illustratively shown in FIG. 1, a user enters an exhibition with the head mounted device 100. The head mounted device 100 will detect an invisible code CD1 and an invisible code CD2 which are projected by a projector 301 and a projector 302 above the exhibition object OBJ1 and the exhibition object OBJ2 when a user changes a position or face in a different direction.

In step 206, the image capturing unit 110 of the head mounted device 100 captures an input image from an invisible domain of an optical spectrum periodically (e.g., five images per second, one image per second or one image every 30 seconds). The input image is approximately same as a sight of the user. Please refer to FIG. 4A-FIG. 4F. The input image 321-326 are obtained when the user change a position or an angle of view as illustratively shown in FIG. 4A-FIG. 4F.

Figure 4A:
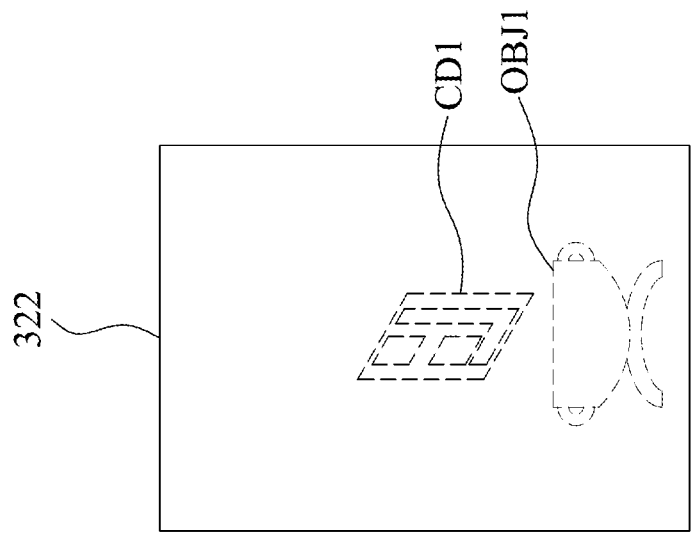
FIG. 4A-FIG. 4F are schematic diagrams of input images corresponding to different positions in accordance with an embodiment of the present disclosure.

As illustratively shown in FIG. 4A, the input image 321 is obtained when the user stands in a position P1 shown in FIG. 1 and takes an angle of view 311 shown in FIG. 1. The input image 321 includes the invisible code CD1.

Figure 4B:
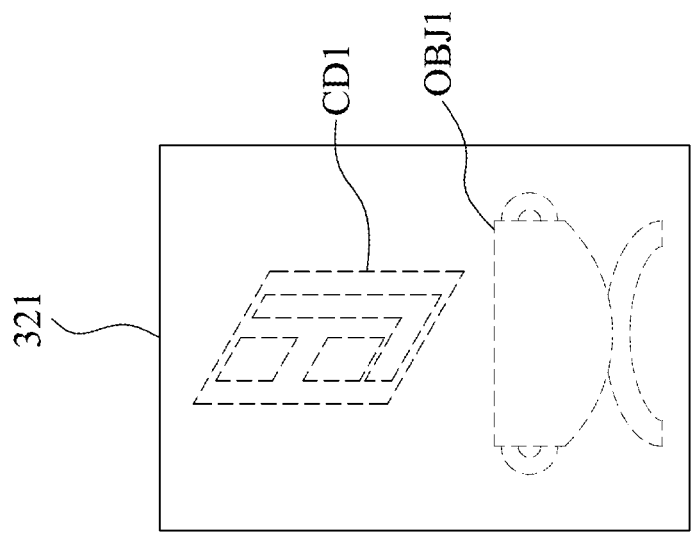

As illustratively shown in FIG. 4B, the input image 322 is obtained when the user stands in a position P2 shown in FIG. 1 and takes an angle of view 311 shown in FIG. 1. The input image 322 includes the invisible code CD1. The angle of view of the input image 322 in FIG. 4B is approximately same as the angle of view of the input image 321 in FIG. 4A. The relative distance between the position P1 and the invisible code CD1 is different from the relative distance between the position P2 and the invisible code CD1. As a result, a size of the invisible code CD1 of the input image 322 shown in FIG. 4B is greater than a size of the invisible code CD1 of the input image 321 shown in FIG. 4A.

Figure 4D:
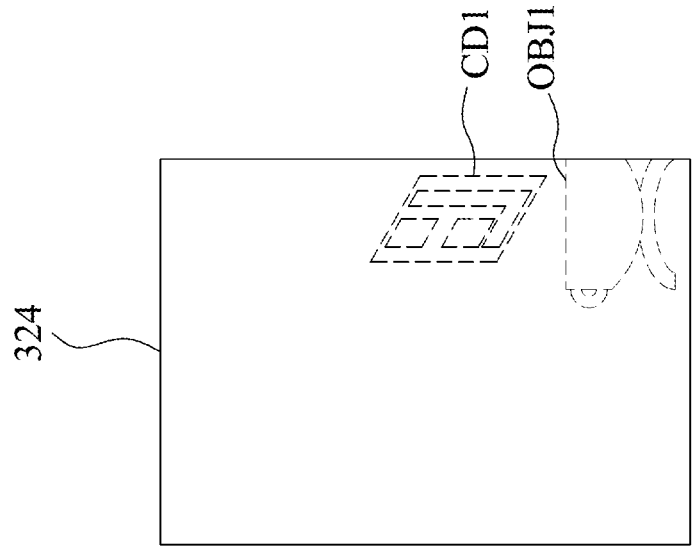
Figure 4C:
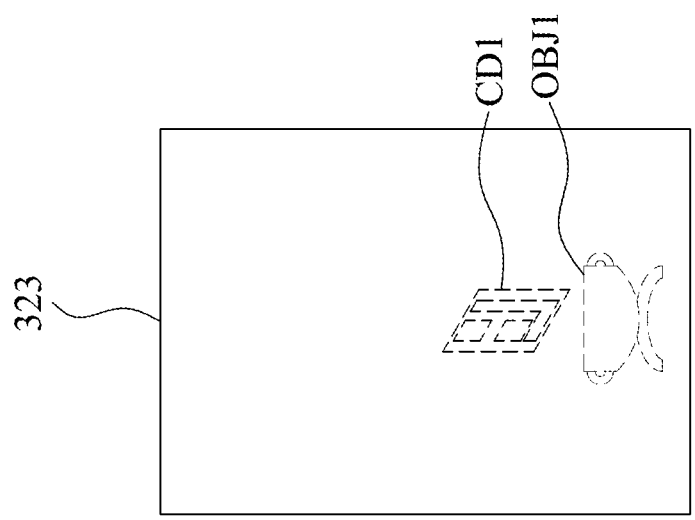

As illustratively shown in FIG. 4C, the input image 323 is obtained when the user stands in a position P3 shown in FIG. 1 and takes an angle of view 311 shown in FIG. 1. The input image 323 includes the invisible code CD1.

As illustratively shown in FIG. 4D, the input image 324 is obtained when the user stands in a position P4 shown in FIG. 1 and takes an angle of view 312 shown in FIG. 1. The input image 324 includes the invisible code CD1.

Figure 4F:
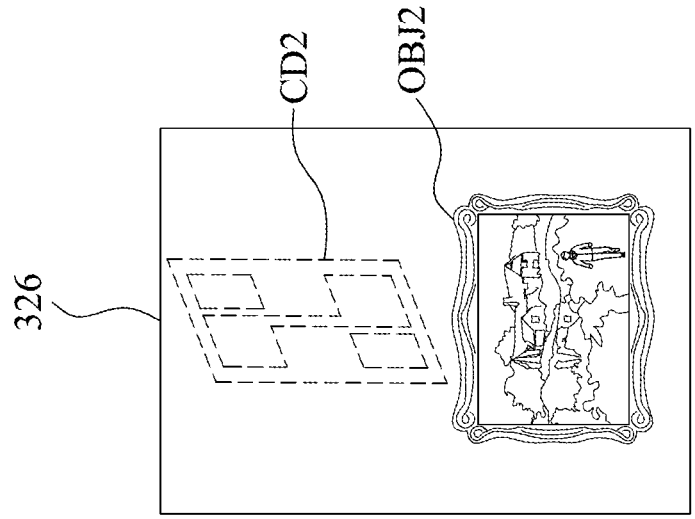
Figure 4E:
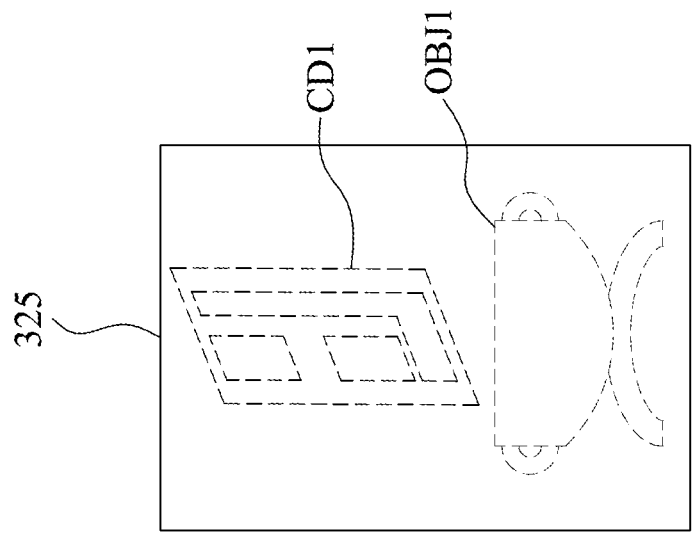

As illustratively shown in FIG. 4E, the input image 325 is obtained when the user stands in a position P5 shown in FIG. 1 and takes an angle of view 313 shown in FIG. 1. The input image 325 includes the invisible code CD1.

As illustratively shown in FIG. 4F, the input image 326 is obtained when the user stands in a position P6 shown in FIG. 1 and takes an angle of view 314 shown in FIG. 1. The input image 326 includes the invisible code CD2.

The input image 321-326 obtained from the position P1-P6 are given for illustration. In fact, the position could be anywhere in an exhibition.

In an embodiment, in step S208, an invisible code may be recognized from the input image obtained in step S206 by the recognition unit 121 of the process module 120 using an algorithm. In some embodiments, the algorithm used by the recognition unit 121 is a QR Code algorithm or an ArUco algorithm, but the present disclosure is not limited to the embodiments. As illustratively shown in FIG. 4A-FIG. 4E, the recognition unit 121 recognizes the invisible code CD1 from the input image 321-325. Similarly, the recognition unit 121 recognizes the invisible code CD2 from the input image 326 as illustratively shown in FIG. 4F.

The invisible code CD1 and the invisible code CD2 have a capability of an anti-rotation barcode. By using an anti-rotation barcode, an invisible code may not restricted to be recognized from a certain angle of view, the invisible code may be accurately recognized from any angle of view to perform a 360 degree interactive guide. In the embodiment, the invisible code with the capability of the anti-rotation barcode may be ArUco Makers or QR Code, but the present disclosure is not limited to this embodiment.

After recognizing an invisible code, the computing unit 122 determines a relative distance between the head mounted device 100 and an invisible code according to a size of the invisible code corresponding to the input image. As illustratively shown in FIG. 1, the user stands in a position P2 near the left side of the exhibition object OBJ1 and takes the angle of view 311 to watch the exhibition object OBJ1. The computing unit 122 determines the relative distance between the position P2 and the invisible code CD1 according to the size of the invisible code corresponding to the input image captured from the position.

After calculating the relative distance, in step S212, the control unit 123 receives the relative distance from the computing unit 122 and compares the relative distance to a threshold distance. When the relative distance between the head mounted device and the invisible code is smaller than the threshold distance, an information interface is triggered to present exhibit-object information. When the relative distance between the head mounted device and the invisible code is greater than the threshold distance, the information interface will not be triggered to present exhibit-object information.

In the embodiment, the invisible code CD1 has a default threshold distance, in other words, the user receives exhibit-object information of the invisible code CD1 when the user is within the range of the threshold distance. As illustratively shown in FIG. 4B, when the relative distance between the user and the invisible code CD1 is approximately equal to the threshold distance and within the range of the threshold distance, the size of the invisible code CD1 corresponding to the input image 322 is approximately 10%.

References are made in FIG. 4A, FIG. 4B and FIG. 4C. The relative distances between the user and the invisible code are determined respectively according to the sizes of the invisible code CD1 respectively corresponding to the input image 321, the input image 322 and the input image 323 captured from the position P1, the position P2 and the position P3. For example, when the user is in position P1, the size of the invisible code CD1 corresponding to the input image 321 is approximately 25%, which is greater than 10%. It is determined that the relative distance of between the position P1 and the invisible code CD1 is smaller than the threshold distance D1. Comparatively, when the user is in position P3, the size of the invisible code CD1 corresponding to the input image 323 is approximately 6%, which is smaller than 10%. It is determined that the relative distance between the position P3 and the invisible code CD1 is smaller than the threshold distance D1.

As examples shown in FIG. 4A and FIG. 4B, The relative distance is smaller than the threshold distance or approximately equal to the threshold distance when the user is in position P1 and position P2. As a result, the user receives exhibit-object information of the exhibition object OBJ1. As an example shown in FIG. 4C, the relative distance is greater than the threshold distance when the user is in position P3. As a result, the user does not receive exhibit-object information of the exhibition object OBJ1.

Figure 3A:
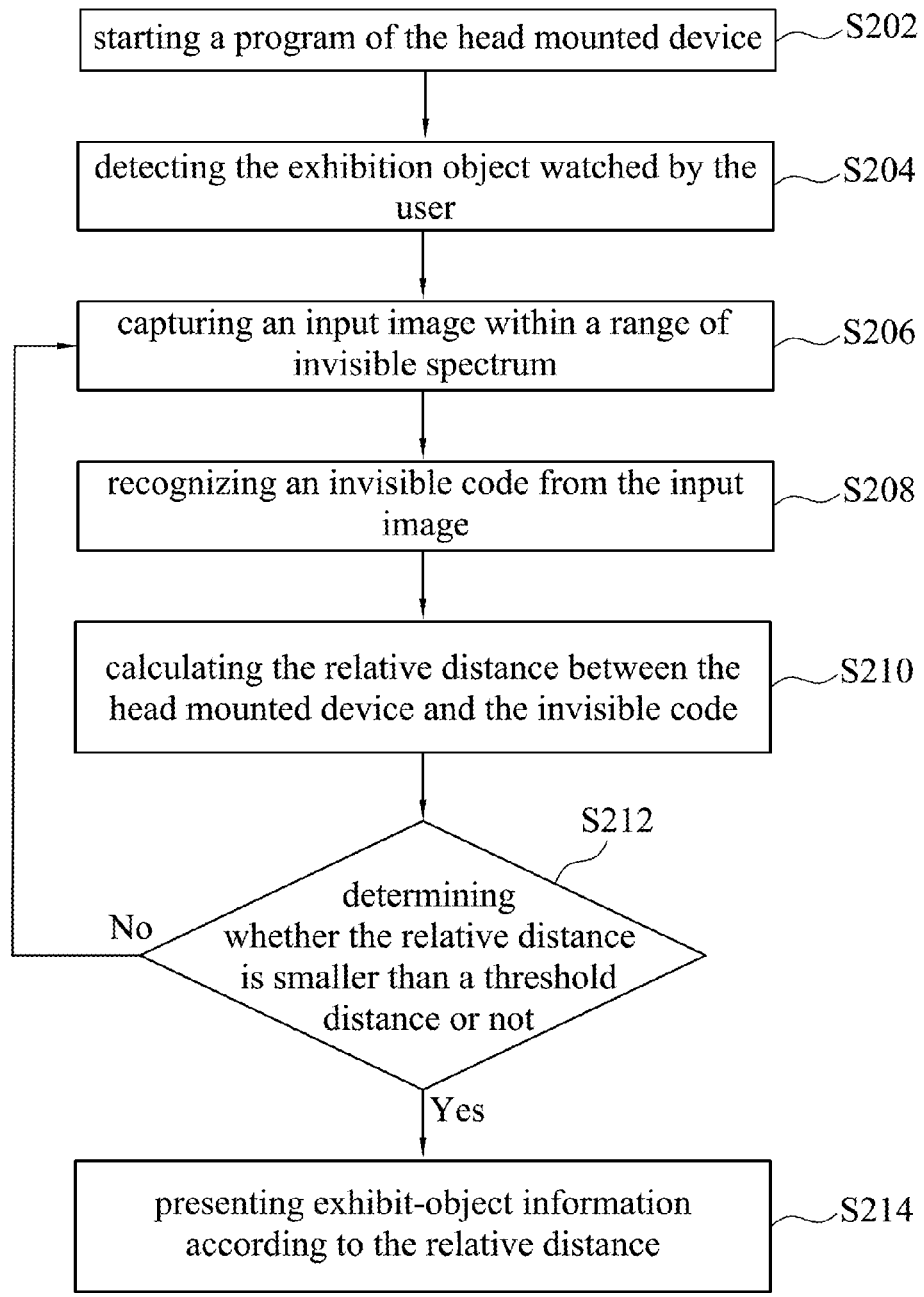
FIG. 3A is a flow chart of a method illustrating a guiding method in accordance with one embodiment of the present disclosure.
Figure 3B:
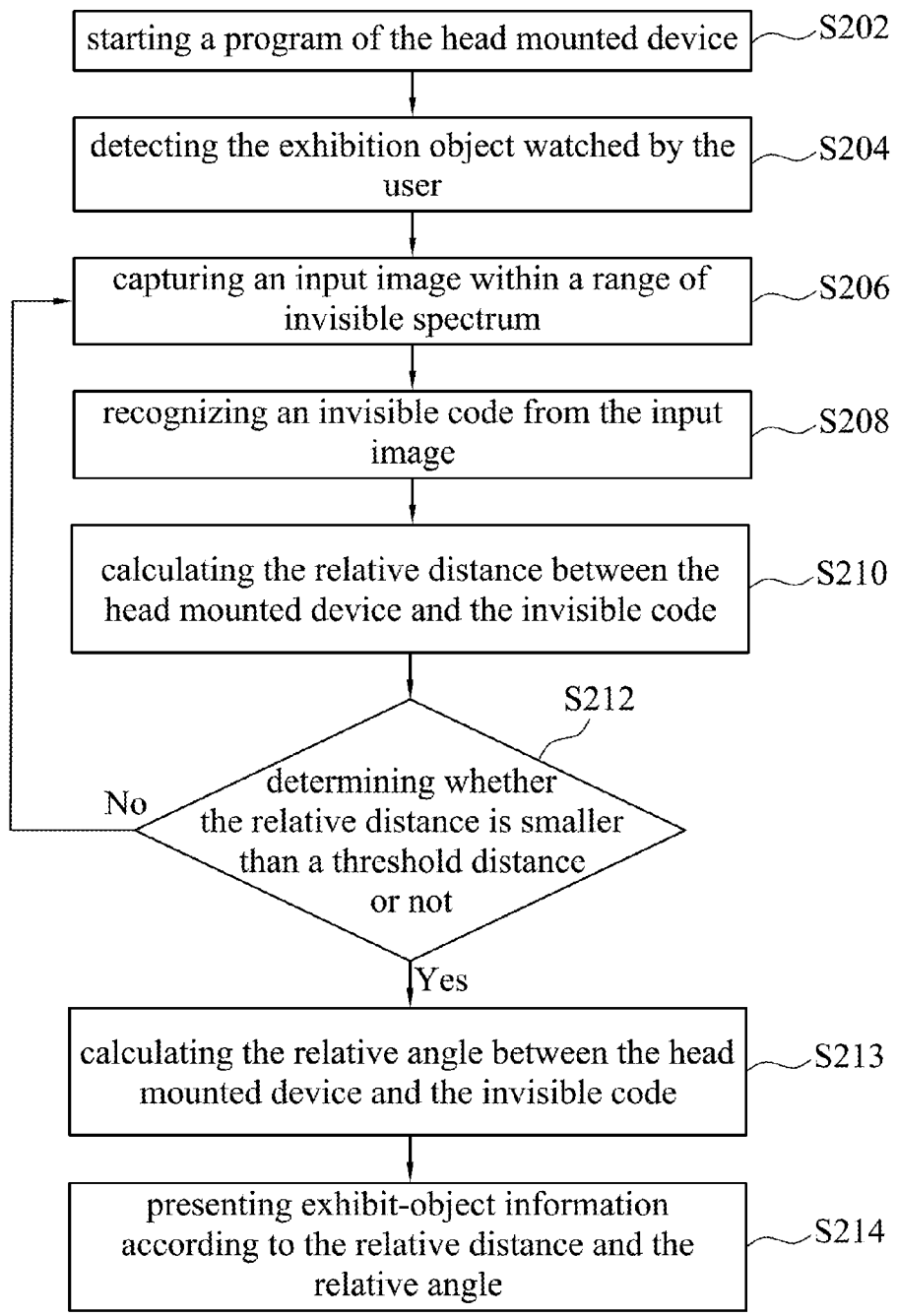
FIG. 3B is a flow chart of a method illustrating a guiding method in accordance with another embodiment of the present disclosure.

In addition to the concern of a relative distance, the present disclosure further concerns a relative angle between a position and the exhibition object OBJ1. Reference is made in FIG. 3. FIG. 3 is a flow chart of method illustrating a guiding method accordance with another embodiment of the present disclosure. By comparing the guiding method 200 shown in FIG. 3A to the guiding method 201 shown in FIG. 3B, it is found that the guiding method 201 shown in FIG. 3B further includes step S213 after step S212. In step S212, when it is determined that the relative distance smaller than the threshold distance, the guiding method 201 triggers step S213.

In step S213, the computing unit 122 calculates the relative angle between the head mounted device and the invisible code and the information interface is triggered to present exhibit-object information.

As illustratively shown in FIG. 4A-FIG. 4C, when the user is in the position P1-P3 and takes the angle of view 311, the exhibition object OBJ1 is approximately in the middle of the input image 321-323. It represents that the angle of view 311 of the user in position P1-P3 is approximately toward the exhibition object OBJ1. In this case, the shift between the invisible code CD1 and the middle line of the input image 324 is small, in other words, the relative angle between the position of the user and the invisible code CD1 is small. On the other hand, the user is in the position P4 and takes the angle of view 312 (the user watches the left side of the exhibition object OBJ1, and the angle of view is not toward the exhibition object OBJ1). In this case, the invisible code CD1 is in the edge of the input image 324 even though the exhibition object OBJ1 is still within the range of the input image 324. It represents that the angle of view of the user in the position P4 is not toward the exhibition object OBJ1. As a result, the shift between the invisible code CD1 and the middle line of the input image 324 is large. In other words, the relative angle between the position of the user and the invisible code CD1 is large.

When the relative distance is smaller than the threshold distance D1 and the relative angle between the position of the user and the invisible code CD1 is small, the control unit 123 triggers the information interface 130. In step S214, the user can receive exhibit-object information of the exhibition object OBJ1 from the information interface 130. For example, when the user is in the position P1 and the position P2 and takes the angle of view 311, the user can obtain exhibit-object information of the exhibition object OBJ1 from the information interface 130.

When the relative distance is smaller than the threshold distance and the relative angle is large, in an embodiment, the control unit 123 does not trigger the information interface 130. As a result, the user does not receive exhibit-object information. For example, when the user is in the position P4 and takes the angle of view 312 (as shown in FIG. 4D), exhibit-object information of the exhibition object is not triggered because the relative angle is large. In another embodiment, the control unit 123 still triggers the information interface 130 when the relative angle is large. In this case, the user still receives exhibit-object information of the exhibition object. In some embodiments, exhibit-object information received by a user is chosen based on the relative angle.

The present disclosure is not limited to the embodiment that an exhibition object only has one exhibit-object introduction. In some embodiment, the head mounted device 100 and the guiding method 200 further make an exhibition object provide various exhibit-object information.

In an embodiment, various of exhibit-object information may be obtained as the user in different angle of views. The input images shown in FIG. 4B and FIG. 4E represents different relative angles between the head mounted device 100 and the invisible code CD1. As the head mounted device 100 is in the left angle of view of the exhibition object OBJ1, a relative angle between the head mounted device and the invisible code is calculated (as shown in FIG. 4B), and the head mounted device 100 triggers the information interface to present a first exhibit-object information (the contents of the exhibit-object information may be the author introduction). On the other hand, when the head mounted device 100 is in the right angle of view of the exhibition object OBJ1, a relative angle between the head mounted device and the invisible code is calculated (as shown in FIG. 4E), and the head mounted device 100 triggers the information interface to present second exhibit-object information (the contents of the exhibit-object information may be the historical background of the exhibition object OBJ1). Various exhibit-object information is not limited to those angels above.

In another embodiment, various exhibit-object information may be obtained when the user watches the exhibition object from different distances. The head mounted device 100 and the guiding method 200 make each exhibition object individually have third exhibit-object information and fourth exhibit-object information. The input images shown in FIG. 4A and FIG. 4B represents different relative distances between the head mounted device 100 and the invisible code CD1. When the relative distance between the head mounted device 100 and the invisible code CD1 is small (as shown in FIG. 4A), the head mounted device 100 and the guiding method 200 trigger the third exhibit-object information of the exhibition object OBJ1 (the content of the third exhibit-object information of the exhibition object OBJ1 may be a pattern of the gunmetal art or a sculpture about the gunmetal art). On the other hand, when the relative distance between the head mounted device 100 and the invisible code CD1 is large (as shown in FIG. 4B), the head mounted device 100 and the guiding method 200 trigger the fourth exhibit-object information of the exhibition object OBJ1 (the content of the fourth exhibit-object information of the exhibition object OBJ1 may be the entire exterior of the gunmetal art, the style of the gunmetal art or the color of the gunmetal art). Beside, various exhibit-object introductions are not limited to those distances above.

In another embodiment, similarly, various exhibit-object information may be obtained by combining different distances and different angles. Further details of combining the distances and the angles may be achieved by a combination of aforesaid embodiments, and not to be repeated herein.

The present disclosure is not limited to the embodiment of performing a guiding method for a single exhibition object OBJ1. As shown in FIG. 1, the user is in position P6 and takes the angle of view 314, and the input image 326 is shown in FIG. 4F. In this case, the input image 326 includes another invisible code CD2. The head mounted device 100 and the guiding method 200 obtain the size and the position of the invisible code CD2 corresponding to the input image 326 according to the contents of the input image 326. Further, the relative distance and the relative angle between the head mounted device 100 and the invisible code CD2 will be determined. When the user is within the range of the threshold distance D2 of the invisible code CD2, exhibit-object information of the exhibition object OBJ2 is presented. Detailed description has been illustrated in the previous embodiments. Please refer to the contents of step S208-step S214 and there is no more repeat herein.

In another embodiment, the head mounted device 100 and the guiding method 200 provide an interactive guiding experience. In step S216, exhibit-object information is not limited to a literal introduction, a voice introduction and an image introduction. In some embodiments, exhibit-object information is an interactive special effect about the exhibition object.

Figure 5:
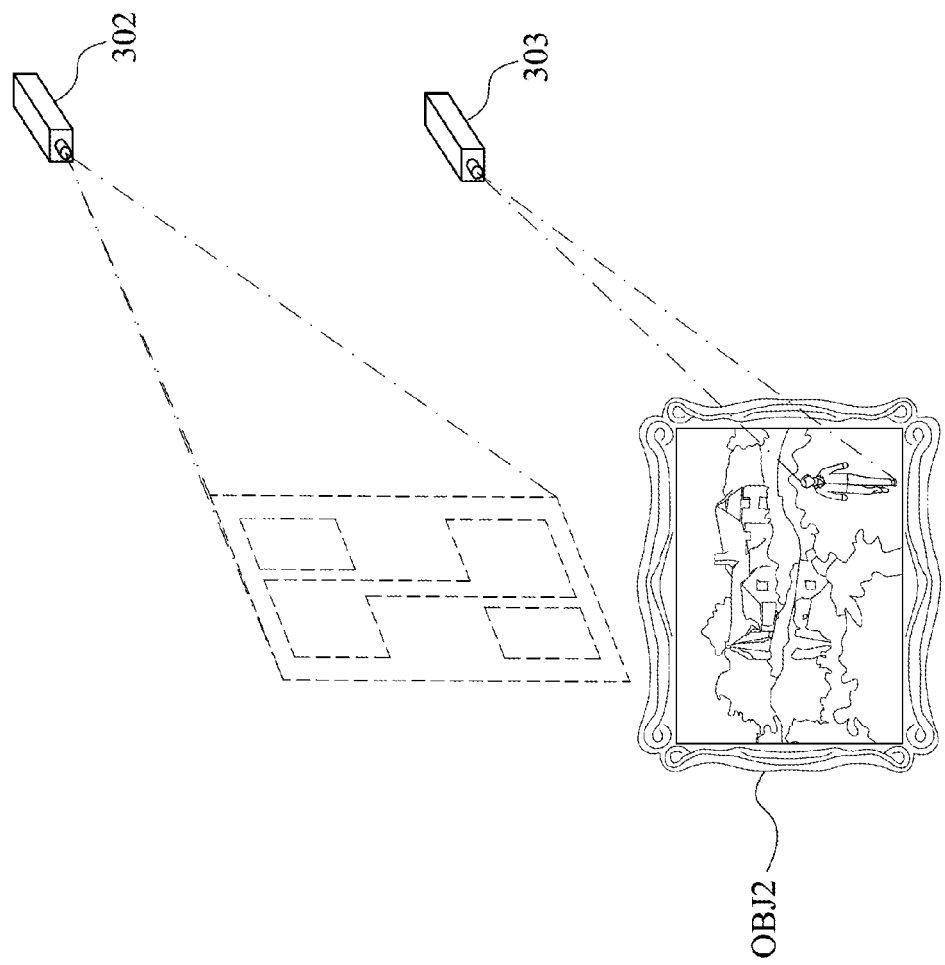
FIG. 5 is a schematic diagram of an interactive guiding experience in accordance with one embodiment of the present disclosure.

When a user changes an angle of view, the user can search for a target according to an animation reminder presented in a screen of the angle of view. The user can find the target by the help of a literal reminder or a voice reminder. When the target has been found, the exhibit-object information presented in step S216 includes an interactive animation. Refer to FIG. 1, when the user in position P6 watches the exhibition object OBJ2 by taking the angle of view 314, a reminder message of the head mounted device 100 presents a target of the exhibition object OBJ2 (in this example, a person looking toward the left side). The user searches for the target by changing the position P6 or the angle of view 314. When approaching the target, the head mounted device 100 provides a literal message or a voice message to help the user find the target. As shown in FIG. 5, an interactive animation is shown when the user finds the target. In an embodiment, the content of the interactive animation is formed by projecting a target screen (in this example, a person looking toward the right side substituting a person looking toward the left side) onto the position of the target via another projector 303.

In another embodiment, the exhibition object OBJ2 is a painting itself presented in an interactive display. The content of the painting may be changed by directly triggering the interactive display so that the person looking toward the left side transforms to be the person looking toward the right side.

What is claimed is:

1. A head mounted device configured for guiding at least one exhibition object comprising:
    an image capturing unit configured to capture an input image in an invisible domain of an optical spectrum;
    an information interface; and
    a process module electrically coupled to the image capturing unit and the information interface comprising:
        a recognition unit configured to recognize at least one invisible code in the input image, each invisible code corresponding to a plurality of exhibit-object information of the at least one exhibition object;
        a computing unit configured to calculate a relative distance between the head mounted device and one of the at least one invisible code according to a size of the at least one invisible code corresponding to the input image; and
        a control unit configured to trigger the information interface to present the exhibit-object information,
    wherein when the relative distance is smaller than the threshold distance, the computing unit calculates a relative angle between the head mounted device and one of the at least one invisible code according to a position of the at least one invisible code corresponding to the input image, and the control unit triggers the information interface to present one of the exhibit-object information according to the relative distance or the relative angle, wherein the computing unit calculates the relative distance according to a proportional dimension of the at least one invisible code corresponding to the input image, wherein the computing unit calculates the relative angle according to a shifting difference of the at least one invisible code corresponding to the input image.

2. The head mounted device of claim 1, wherein each exhibit-object introduction comprises a first exhibit-object information and a second exhibit-object information different from the first exhibit-object introduction, and the head mounted device further comprises:

the control unit triggers the information interface to present a first exhibit-object information when a computing unit determines the relative angle between the head mounted device and one of the at least one invisible code is in a first angle or the relative distance between the head mounted device and one of the at least one invisible code is in a first distance; and the control unit triggers the information interface to present a second exhibit-object information when a computing unit determines the relative angle between the head mounted device and one of the at least one invisible code is in a second angle or the relative distance between the head mounted device and one of the at least one invisible code is in a second distance.

3. The head mounted device of claim 1, wherein the exhibit-object information comprises a plurality of reminder messages, and the reminder messages are configured to search a target screen by changing the relative distance between the head mounted device and one of the at least one invisible code or the relative angle between the head mounted device and one of the at least one invisible code.

4. The head mounted device of claim 3, wherein the reminder messages comprises a first reminder message and a second reminder message different from the first reminder message, and the first reminder message is presented when the relative angle between the head mounted device and one of the at least one invisible code is in a first angle or the relative distance between the head mounted device and one of the at least one invisible code is in a first distance, and the second reminder message is presented when the relative angle between the head mounted device and one of the at least one invisible code is in a second angle or the relative distance between the head mounted device and one of the at least one invisible code is in a second distance.

5. The head mounted device of claim 1, the at least one invisible code is generated by a projector or an active light-emitting component.

6. The head mounted device of claim 1, wherein the information interface comprises at least one of a literal introduction unit, a voice introduction unit, an image introduction unit, a multimedia introduction unit or an entity signal introduction unit, the exhibit-object information comprises at least one of a literal introduction, a voice introduction, an image introduction, a multimedia introduction or an entity signal introduction.

7. A guiding method suitable for a head mounted device comprising:

capturing an input image in an invisible domain of an optical spectrum;

recognizing at least one invisible code in the input image, each invisible code corresponding to a plurality of exhibit-object information of at least one exhibition object;

determining a relative distance between the head mounted device and one of the at least one invisible code according to a size of the at least one invisible code corresponding to the input image, wherein the relative distance is calculated according to a proportional dimension of the at least one invisible code corresponding to the input image;

comparing the relative distance to a threshold distance; and calculating a relative angle between the head mounted device and one of the at least one invisible code according to a position of the at least one invisible code corresponding to the input image when determining that the relative distance is smaller than the threshold distance, wherein the relative angle is calculated according to a shifting difference of the at least one invisible code corresponding to the input image;

presenting the plurality of exhibit-object information corresponding to the at least one exhibition object according to the relative distance or the relative angle.

8. The guiding method of 7, wherein the exhibit-object information comprise a first exhibit-object information and a second exhibit-object information different from the first exhibit-object information, and the guiding method further comprises:

presenting the first exhibit-object information when determining the relative angle between the head mounted device and one of the at least one invisible code is in a first angle or the relative distance between the head mounted device and one of the at least one invisible code is a first distance; and presenting the second exhibit-object information when determining the relative angle between the head mounted device and one of the at least one invisible code is in a second angle or the relative distance between the head mounted device and one of the at least one invisible code is a second distance.

9. The guiding method of claim 7, wherein the exhibit-object information comprises a plurality of reminder messages, and the guiding method further comprises:

searching a target screen by changing the relative distance between the head mounted device and one of the at least one invisible code or the relative angle between the head mounted device and one of the at least one invisible code.

10. The guiding method of 7, wherein the plurality of exhibit-object information include at least one of a literal introduction, a voice introduction, an image introduction, a multimedia introduction or an entity signal introduction.

11. The guiding method of 7, the at least one invisible code is generated by a projector or an active light-emitting component.

12. A displaying method for a head mounted device, the display method comprising:

capturing an input image in an invisible domain of an optical spectrum;

recognizing at least one invisible code in the input image, each invisible code corresponding to a plurality of exhibit-object information of at least one exhibition object;

projecting a first displaying screen comprising a target screen;

presenting a reminder message to search the target screen by taking an angle of view from a position in a range of a threshold distance to watch the first display screen, wherein the angle of view is a relative angle of the position and the first displaying screen, and the relative angle is calculated according to a shifting difference of the at least one invisible code corresponding to the input image;

changing the position and the angle of view to watch the first display screen according to the reminder message; and projecting a second displaying screen substituting the first displaying screen when the target screen is found.

13. The displaying method of claim 12, wherein the reminder message comprises a first reminder message and a second reminder message different from the first reminder message, and the displaying method further comprising:

presenting the first reminder message when watching the first displaying screen from a first position or a first angle of view; and presenting the second reminder message when watching the first displaying screen from a second position or a second angle of view.

14. The displaying method of claim 12, the reminder message comprises one of a literal reminder or a voice reminder.

\* \* \* \* \*